Patented Oct. 28, 1941

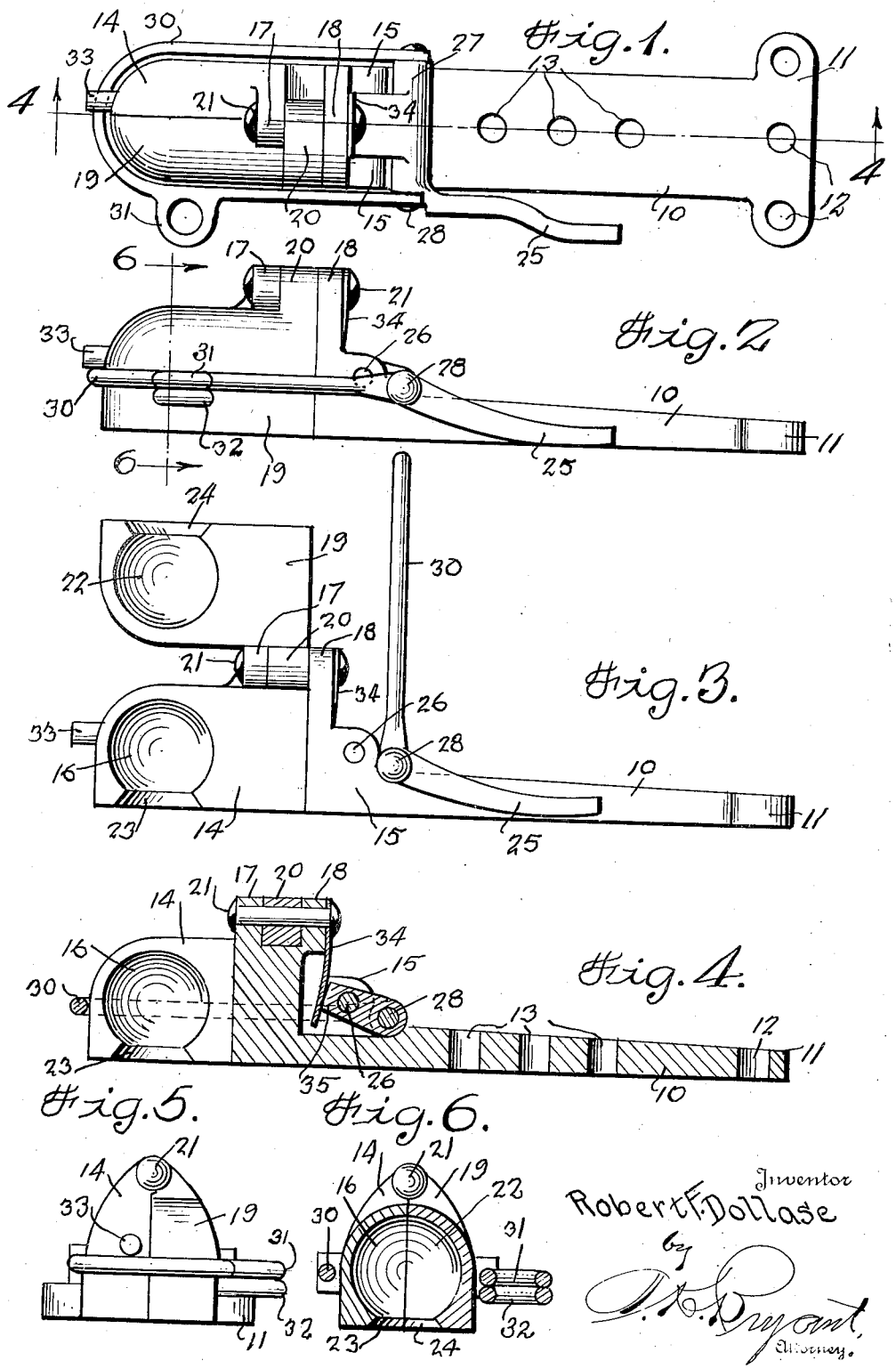

2,260,442

UNITED STATES PATENT OFFICE 2,260,442

TRAILER HITCH

Robert F. Dollase, Fort Atkinson, Wis.

Application July 27, 1940, Serial No. 347,995

5 Claims. (Cl. 280—33.17)

This invention relates to certain new and useful improvements in trailer hitches.

The primary object of the invention is to provide a trailer hitch which may be easily coupled and uncoupled with a minimum of effort and which will be durable and dependable during its use as a trailer connection.

A further object of this invention is to provide a trailer hitch formed of separable sections transversely movable relative to a longitudinal axis whereby longitudinal strains and stresses will be more easily rebuffed and the possibility of separation of the separable sections is prevented.

A further object of this invention is to provide a trailer hitch in which the transversely separable sections are rigidly held together by means of a hasp swinging transversely over the sections to prevent their separation and to provide a locking lever which is swung to a position so that the pivot point thereof will be off center with respect to the locking hasp and operating handle.

Other objects and advantages of the invention will become apparent during the course of the following description of the accompanying drawing, wherein, Figure 1 is a top elevational view of the trailer hitch embodying the invention;

Figure 2 is a side elevational view of the trailer hitch illustrating the locking lever and its associated parts;

Figure 3 is a side elevational view illustrating the manner in which the separable sections are hinged for receiving the usual ball connection member;

Figure 4 is a longitudinal cross-sectional view taken on line 4—4 of Figure 1, looking in the direction of the arrows, illustrating the structural details of the invention;

Figure 5 is an end elevational view showing the separable sections in their closed position; and Figure 6 is a vertical cross-sectional view taken on line 6—6 of Figure 2, looking in the direction of the arrows, illustrating the spherical socket member.

In the drawing, wherein for the purpose of illustrating the invention and wherein like reference characters will be employed to designate like parts throughout the same, the reference character 10 will be employed to generally designate a shank portion having a T-shaped end 11 provided with a series of apertures 12 for receiving bolts so that the shank 10 may be connected to a trailer of the automotive type. Openings 13 are provided in the longitudinal portion of the shank 10 for allowing further passage of bolts to anchor the trailer hitch in place.

The opposite end of the shank is provided with a pair of separable jaw members and one of the jaw members as at 14 is formed integral with the shank 10 and is connected thereto by side web portions 15. The jaw member 14 is provided with a spherical socket 16 and a pair of opposed bosses 17 and 18 project upwardly from the stationary jaw member 14 for receiving a movable jaw member 19 having a boss 20 projecting between the bosses 17 and 18.

A hinge pintle 21 projects through the bosses 17 and 18 and the movable jaw member 19 is provided with a socket 22 complementary to the socket 16 in the jaw member 14 so that when the separable jaw members 14 and 19 are in a closed position as shown in Figure 6, they will form a spherical cavity for receiving the ball connector carried by the motor vehicle.

The lower portions of the spherical cavities 16 and 22 are flared outwardly as at 23 and 24 respectively for facilitating the easy alignment of the ball socket member.

Pivotally mounted between the webs 15 by means of a transverse pivot pin 26 is a hand lever 25 and said lever is provided with a lateral tubular extension 27 having a central bore for the passage of a pin 28 as shown clearly in Figure 4.

Secured to the pivot pin 28 is a U-shaped loop or hasp member 30 having an eye formed therein as at 31 for cooperating with an eye 32 rigidly secured to the separable jaw member 19 so that a lock may be passed through the eyes to lock the members together. The U-shaped hasp 30 is adapted to swing vertically into position over the projection 33 formed integral with the stationary jaw member 14 so that the hasp will tightly embrace the jaw sections when they are in their closed position. After the jaws are in position and the hasp is passed thereover, the hand lever 25 is swung downwardly so that the pivot pin 28 will be off center with respect to the operating handle pivot pin 26.

A leaf spring 34 is anchored in place by the pintle 21 and has its free end extending downwardly into rubbing contact with the squared end 35 of the operating lever 25 so that as the lever is moved in its closed position, the spring will retain it and prevent accidental jarring to an open position.

It will be understood that the form of the invention herewith shown and described is to be taken as a preferred embodiment of the same, and that various changes in the shape, size and arrangement of parts may be resorted to without departing from the spirit and scope of the invention as claimed.

I claim:

1. A trailer hitch comprising a shank, a pair of complementary jaw members carried by one end of the shank, one of said jaw members being integral with the shank, the other jaw member being pivotally mounted on an axis extending longitudinally of the shank for movements transversely of the longitudinal axis of the shank, and means for locking the jaw members in closed position.

2. A trailer hitch comprising a shank, a stationary jaw member carried by the shank, a complementary movable jaw member adapted to swing transversely of the shank on an axis extending longitudinally of the shank, and means for locking the movable jaw member in operative position.

3. A trailer hitch comprising a shank, a stationary jaw member projecting longitudinally in alignment with the shank member, a complementary jaw member adapted to swing transversely of the shank on a longitudinal pivot pin into and out of engagement with the stationary jaw member, said jaw members having downwardly opening mating ball receiving socket portions, and means for retaining the jaw members in closed position including a hand lever pivoted on the shank and a locking hasp pivoted on the hand lever adapted to be swung over the jaw members when in their closed position with the hasp pivot movable beyond the lever pivot.

4. A trailer hitch comprising a shank member, a stationary jaw projecting in longitudinal alignment with the shank member, a movable jaw having a complementary stationary jaw engaging face swingable into and out of engagement on a longitudinal pivot pin carried by the stationary jaw, a U-shaped hasp adapted to partially encircle the jaw members and a locking lever associated with the U-shaped hasp.

5. A trailer hitch comprising a shank portion, a stationary jaw member projecting in longitudinal alignment with the shank, a complementary movable jaw pivoted on a longitudinal pin carried by the stationary jaw, a locking lever having its end pivoted between the shank and jaw members and a U-shaped hasp adapted to be swung over the jaw members and having its free ends pivoted in spaced relation to the locking lever so that the locking lever pivot point will be out of alignment with the U-shaped hasp pivot point when the locking lever is in its closed position.

ROBERT F. DOLLASE.